(12) United States Patent
McKernan et al.

(10) Patent No.: US 12,545,943 B2
(45) Date of Patent: Feb. 10, 2026

(54) **METHODS OF DETECTING MICROBIAL CONTENT IN *CANNABIS***

(71) Applicant: MEDICINAL GENOMICS CORPORATION, Beverly, MA (US)

(72) Inventors: Kevin J. McKernan, Beverly, MA (US); Yvonne Helbert, Beverly, MA (US); Heather Ebling, Beverly, MA (US)

(73) Assignee: MEDICINAL GENOMICS CORPORATION, Beverly, MA (US)

( * ) Notice: Subject to any disclaimer, the term of this patent is extended or adjusted under 35 U.S.C. 154(b) by 1152 days.

(21) Appl. No.: 17/441,842

(22) PCT Filed: Mar. 26, 2020

(86) PCT No.: PCT/US2020/024921
§ 371 (c)(1),
(2) Date: Sep. 22, 2021

(87) PCT Pub. No.: WO2020/198452
PCT Pub. Date: Oct. 1, 2020

(65) Prior Publication Data
US 2022/0098637 A1    Mar. 31, 2022

Related U.S. Application Data

(60) Provisional application No. 62/824,201, filed on Mar. 26, 2019.

(51) Int. Cl.
| | |
|---|---|
| *C12Q 1/6851* | (2018.01) |
| *C12N 9/22* | (2006.01) |
| *C12Q 1/06* | (2006.01) |
| *C12R 1/67* | (2006.01) |
| *C12R 1/68* | (2006.01) |
| *C12R 1/685* | (2006.01) |

(52) U.S. Cl.
CPC ............ *C12Q 1/06* (2013.01); *C12N 9/22* (2013.01); *C12Q 1/6851* (2013.01); *C12R 2001/67* (2021.05); *C12R 2001/68* (2021.05); *C12R 2001/685* (2021.05)

(58) Field of Classification Search
CPC .......... C12N 1/06; C12Q 1/06; C12Q 1/6806; C12Q 1/6851; C12Q 1/6848; C12Q 1/6895; C12Q 2521/30; C12Q 2521/319; C12Q 2521/325
See application file for complete search history.

(56) References Cited

U.S. PATENT DOCUMENTS

| | | |
|---|---|---|
| 9,580,679 B2 | 2/2017 | Njoroge et al. |
| 2018/0112201 A1* | 4/2018 | Chen Zeltsburg ... A61K 38/465 |
| 2018/0251758 A1 | 9/2018 | Hogan et al. |
| 2018/0251822 A1* | 9/2018 | Hogan ............... C12Q 1/689 |
| 2019/0085415 A1 | 3/2019 | Hogan et al. |

FOREIGN PATENT DOCUMENTS

WO    WO-2016112179 A1 *    7/2016

OTHER PUBLICATIONS

Schilling et al. Cannabis sativa. Current Biology 2020; 30: R8-R9. (Year: 2020).*
Okabe et al. Conformational Changes in Deoxyribonuclease I in Anionic and Cationic Surfactant Solutions. Biol. Pharm. Bull. 1993; 16: 1294-1296. (Year: 1993).*
Umesha et al. A rapid method for isolation of genomic DNA from food-borne fungal pathogens. 3 Biotech 2016; 6: 123. (Year: 2016).*
Dec. 28, 2022 Office Action issued in Canadian Patent Application No. 3,134,062.
Kuske et al, "Small-Scale DNA Sample Preparation Method for Field PCR Detection of Microbial Cells and Spores in Soil," Applied and Environmental Microbiology, vol. 64, No. 7, Jul. 1998, pp. 2463-2472.
Lau, "Development of Point-of-Care and Multiplex Diagnostic Methods for the Detection of Plant Pathogens," Aug. 16, 2016, the University of Queensland, Thesis, pp. i, 26, 45, 66, 68, 75, 95.
Brunstein, "Process controls: Internal and External," Medical Laboratory Observer, www.mlo-online.com, Nov. 18, 2013, pp. 1-4.
Jun. 23, 2020 International Search Report issued in PCT Application No. PCT/US2020/024921.
Jun. 23, 2020 Written Opinion of the International Searching Authority issued in PCT Application No. PCT/US2020/024921.
Dec. 5, 2022 Extended European Search Report issued in European Patent Application No. 20 780 045.9.
McKernan et al., "Cannabis Microbiome Sequencing Reveals Several Mycotoxic Fungi Native to Dispensary Grade Cannabis Flowers," URL:https://f1000research.com/articles/4-1422/v1/iparadigms, retrieved Nov. 1, 2022, F1000RESEARCH, vol. 4, No. 1422, 2015, pp. 1-27.

(Continued)

*Primary Examiner* — Angela M. Bertagna
(74) *Attorney, Agent, or Firm* — MH2 Technology Law Group, LLP (57) ABSTRACT

A method for determining a level of one or more live microbes in a sample of a *Cannabis* plant includes (a) introducing a DNase enzyme into a sample including (i) *Cannabis* plant matrix derived from lysed cells of a *Cannabis* plant and (ii) live microbial cells including microbial genomic DNA, (b) introducing an anionic detergent into the sample, where the anionic detergent is in an amount effective to inactivate the DNase enzyme in the sample and lyse the live microbial cells in the sample, (c) introducing a known quantity of control DNA into the sample, (d) contacting the sample with a plurality of polynucleotide capture agents, (e) isolating the plurality of polynucleotide capture agents, thereby isolating polynucleotides from the microbial genomic DNA and/or control DNA in the sample, and (f) amplifying at least a portion of polynucleotides from the microbial genomic DNA isolated in step (e).

24 Claims, 5 Drawing Sheets

(56) References Cited

OTHER PUBLICATIONS

Villarreal et al., "DNase I and Proteinase K Eliminate DNA from Injured or Dead Bacteria but Not from Living Bacteria in Microbial Reference Systems and Natural Drinking Water Biofilms for Subsequent Molecular Biology Analyses," Journal of Microbiological Methods, vol. 94, No. 3, 2013, pp. 161-169.
Anonymous, "DNase I, RNase-Free," Thermo Scientific Instructions, User Guide, Nov. 12, 2020, pp. 1-3, URL: https://ww.thermofisher.com/document-connect/document-connect.html?url=https%3A%2F%2Fassets.thermofisher.com%2FTFS-Assets%2FLSG%2FMAN0011904_Dnase_I_RNasefree_UG.pdf, retrieved Nov. 21, 2022.
Anonymous, "DNase Inactivation Buffer (2X)," Cold Spring Harbor Protocols, vol. 2010, No. 6, Jun. 1, 2010.

\* cited by examiner

METHODS OF DETECTING MICROBIAL CONTENT IN *CANNABIS*

CROSS-REFERENCE TO RELATED APPLICATION

This application claims the benefit of priority of U.S. Provisional Application No. 62/824,201, filed Mar. 26, 2019, which is incorporated herein by reference in its entirety.

BACKGROUND

*Cannabis* is an annual herbaceous flowering plant that has been cultivated throughout recorded history for use as fiber, seed oil, food, medicine and recreation. With increasing legalization of *Cannabis* for medicinal and recreational consumption, there is an ongoing need for improved methods to ensure *Cannabis* product quality and safety.

SUMMARY

The present disclosure provides methods of detecting and/or quantifying microbial content of plant samples, such as from a *Cannabis* plant. The present disclosure provides the insight that methods that leverage DNase digestion with subsequent DNase inactivation (e.g., by detergent-mediated lysis) and polynucleotide capture offer robust and simplified means to analyze microbial content of samples (e.g., *Cannabis* samples).

The present disclosure further recognizes certain limits associated with previous assays to characterize microbial content in that they are ineffective, imprecise and/or inefficient for detecting, inter alia, endophytic microbes. Among other things, the present disclosure identifies a problem with certain existing methods for analyzing microbial content that include DNase digestion in that they include inefficient means for inactivating and/or removing DNase. One such method for deactivating DNase includes enzymatic inactivation by Proteinase K (PK). The present disclosure encompasses a recognition that DNase inactivation can be accomplished by detergent-mediated lysis and polynucleotide capture, thereby eliminating a need to for prior inefficient inactivation techniques, e.g., enzymatic (e.g., PK) inactivation of DNase.

In some embodiments, a method for determining a level of one or more live microbes in a sample of a *Cannabis* plant includes: (a) introducing a DNase enzyme into a sample comprising (i) *Cannabis* plant matrix derived from lysed cells of a *Cannabis* plant and (ii) live microbial cells comprising microbial genomic DNA; (b) introducing an anionic detergent into the sample, wherein the anionic detergent is in an amount effective to inactivate the DNase enzyme in the sample and lyse the live microbial cells in the sample, thereby releasing microbial genomic DNA from the microbial cells; (c) introducing a known quantity of control DNA into the sample; (d) contacting the sample with a plurality of polynucleotide capture agents, wherein each polynucleotide capture agent binds one or more polynucleotides from the microbial genomic DNA and/or control DNA in the sample; (e) isolating the plurality of polynucleotide capture agents, thereby isolating polynucleotides from the microbial genomic DNA and/or control DNA in the sample; and (f) amplifying at least a portion of polynucleotides from the microbial genomic DNA isolated in step (e).

In some embodiments, steps of introducing an anionic detergent into a sample and contacting a sample with a plurality of polynucleotide capture agents are performed within 5 minutes of each other, within 2 minutes of each other, within 1 minute of each other, within less than 30 seconds of each other, within less than 15 seconds of each other, or substantially simultaneously.

In some embodiments, steps of: introducing an anionic detergent, introducing a known quantity of control DNA, and contacting a sample with a plurality of polynucleotide capture agents are performed within 5 minutes of each other, within 2 minutes of each other, within 1 minute of each other, within less than 30 seconds of each other, within less than 15 seconds of each other, or substantially simultaneously.

In some embodiments, a method further includes quantifying amplified polynucleotides. In some embodiments, data obtained from quantifying amplified polynucleotides is used to determine a level of microbial genomic DNA in a sample of a *Cannabis* plant. In some embodiments, data obtained from quantifying amplified polynucleotides is used to determine a level of live microbial genomic DNA in a sample of a *Cannabis* plant.

In some embodiments, a step of amplifying is by or includes PCR, e.g., quantitative PCR (qPCR). In some embodiments, quantitative PCR is multiplexed qPCR.

In some embodiments, data obtained by quantitative PCR (qPCR) (e.g., multiplexed qPCR) is used to determine a level of microbial genomic DNA from live microbes in a sample of a *Cannabis* plant.

In some embodiments, a sample of *Cannabis* plant matrix further comprises free microbial DNA from dead microbial cells. In some embodiments, data obtained by qPCR (e.g., multiplexed qPCR) is used to determine a live-dead ratio microbial cells in a sample of a *Cannabis* plant.

In some embodiments, a method includes amplifying at least a portion of polynucleotides from control DNA.

In some embodiments, a method further includes introducing a known quantity of control DNA into a sample prior to introducing a DNase enzyme, where said control DNA introduced prior to introducing a DNase enzyme is not the same as the control DNA introduced at step (c). In some embodiments, a control DNA introduced at step (c) is a control for inactivation of DNase enzyme and a control DNA introduced prior to introducing a DNase enzyme is a control for incomplete DNase enzyme-mediated digestion.

In some embodiments, provided methods include amplifying at least a portion of polynucleotides of isolated microbial genomic DNA isolated and amplifying at least a portion of polynucleotides from one or both of (i) a control DNA introduced after or substantially at the same time as the step of introducing an anionic detergent and (ii) a control DNA introduced prior to the step of introducing a DNase enzyme. In some embodiments, amplifying is by qPCR (e.g., multiplexed qPCR). In some embodiments, data obtained from quantifying amplified polynucleotides is used to determine a level of microbial genomic DNA in a sample of a *Cannabis* plant. In some embodiments, data obtained from quantifying amplified polynucleotides is used to determine a level of live and/or dead microbial genomic DNA in a sample of a *Cannabis* plant.

In some embodiments, a plurality of polynucleotide capture agents are or comprise solid phase carrier agents. In some embodiments, a plurality of polynucleotide capture agents are or comprise solid phase reversible immobilization (SPRI) agents. In some embodiments, SPRI agents are or comprise Seradyne COOH beads.

In some embodiments, an anionic detergent is a dodecyl sulphate salt, e.g., lithium dodecyl sulphate (LiDS) or sodium dodecyl sulphate (SDS). In some embodiments, an anionic detergent is LiDS. In some embodiments, an effective amount of LiDS is within a range of about 0.1% (w/v) to about 5% (w/v) LiDS. In some certain embodiments, an effective amount of LiDS is in a total amount within a range of about 0.5% (w/v) to about 3% (w/v) LiDS.

In some embodiments, a DNase enzyme is a DNaseI enzyme or a DNaseA enzyme. In some certain embodiments, a DNase enzyme is a DNaseI enzyme.

In some embodiments, live microbial cells are or include live endophytic cells. In some embodiments, live microbial cells are endophytic bacterial cells and/or endophytic fungal cells.

In some embodiments, live endophyte cells include pathogenic endophyte cells. In some embodiments, endophyte cells are or include pathogenic endophytic bacterial cells and/or pathogenic endophytic fungal cells.

In some embodiments, live microbial cells are endophytic fungal cells. In some embodiments, live microbial cells are or include *Aspergillus* cells. In some embodiments, *Aspergillus* cells are or include *Aspergillus ostianus* cells, *Aspergillus fumigatus* cells, *Aspergillus flavus* cells, *Aspergillus niger* cells, *Aspergillus terreus* cells, and/or *Aspergillus sydowii* cells.

In some embodiments, dead microbial cells are or include dead endophytic cells. In some embodiments, dead microbial cells are or include endophytic bacterial cells and/or endophytic fungal cells. In some embodiments, dead endophyte cells include pathogenic endophyte cells. In some embodiments, endophyte cells are or include pathogenic endophytic bacterial cells and/or pathogenic endophytic fungal cells.

In some embodiments, dead microbial cells are endophytic fungal cells. In some embodiments, dead microbial cells are or include *Aspergillus* cells. In some embodiments, *Aspergillus* cells are or include *Aspergillus ostianus* cells, *Aspergillus fumigatus*, *Aspergillus flavus* cells, *Aspergillus niger* cells, *Aspergillus terreus* cells and/or *Aspergillus sydowii* cells.

In some embodiments, a *Cannabis* plant is a *C. sativa* plant, a *C. indica* plant, or a *C. ruderalis* plant.

In some embodiments, *Cannabis* plant matrix is derived from lysed cells of a leaf, stem, and/or root of a *Cannabis* plant. In some embodiments, *Cannabis* plant matrix is derived from *Cannabis* plant cells lysed by homogenization in a liquid broth.

In some embodiments, a *Cannabis* plant has been irradiated. In some embodiments, *Cannabis* plant matrix is derived from lysed cells of a *Cannabis* plant that has been irradiated. In some embodiments, *Cannabis* plant matrix is derived from lysed cells of a leaf, stem, and/or root of a *Cannabis* plant that has been irradiated. In some embodiments, *Cannabis* plant matrix is derived from *Cannabis* plant cells lysed by homogenization in a liquid broth.

In some embodiments, a method does not include introducing into the sample Proteinase K.

In some embodiments are provided methods for determining if a *Cannabis* plant is safe for public distribution, the method comprising determining a level of one or more live microbes in a sample of a *Cannabis* plant. In some embodiments, if a determined level of one or more live microbes is below a threshold value, then processing the plant as a *Cannabis* product. In some embodiments, if a determined level of one or more live microbes is above a threshold value, then taking alternative action, such as, for example, disposing of a *Cannabis* plant, classifying a *Cannabis* plant for disposal, and/or further sterilization (e.g., irradiation) of a *Cannabis* plant.

In some embodiments are provided methods for selection of a *Cannabis* plant for processing, the method comprising determining a level of one or more live microbes in a sample of a *Cannabis* plant. In some embodiments, if a determined level of one or more live microbes is below a threshold value, then processing the plant as a *Cannabis* product. In some embodiments, if a determined level of one or more live microbes is above a threshold value, then taking alternative action, such as, for example, disposing of a *Cannabis* plant, classifying a *Cannabis* plant for disposal, and/or further sterilization (e.g., irradiation) of a *Cannabis* plant.

In some embodiments are provided methods for characterizing sterilization of *Cannabis* plant, the method comprising determining a level of one or more live microbes in a sample of a *Cannabis* plant. In some embodiments, methods of the present disclosure can be used to quantify sterilization efficiency (e.g., efficiency of sterilization of a *Cannabis* plant, e.g., by irradiation).

In some embodiments, a method for determining a level of one or more live microbes in a sample of a *Cannabis* plant includes: (a) introducing a DNase enzyme (e.g., DNase I) into a sample comprising (i) *Cannabis* plant matrix derived from lysed cells of a *Cannabis* plant and (ii) live microbial cells comprising microbial genomic DNA; (b) introducing an anionic detergent (e.g., LiDS) into the sample, wherein the anionic detergent is in an amount effective to inactivate the DNase enzyme in the sample and lyse the live microbial cells in the sample, thereby releasing microbial genomic DNA from the microbial cells; (c) introducing a known quantity of control DNA into the sample; (d) contacting the sample with a plurality of solid phase carrier agents, wherein each solid phase carrier agent binds one or more polynucleotides from the microbial genomic DNA and control DNA in the sample; (e) isolating the plurality of solid phase carrier agents, thereby isolating polynucleotides from the microbial genomic DNA and control DNA in the sample; and (f) amplifying by qPCR at least a portion of polynucleotides from the microbial genomic DNA isolated in step (e).

In some embodiments, steps of: introducing an anionic detergent, introducing a known quantity of control DNA, and contacting a sample with a plurality of polynucleotide capture agents are performed within 5 minutes of each other, within 2 minutes of each other, within 1 minute of each other, within less than 30 seconds of each other, within less than 15 seconds of each other, or substantially simultaneously.

In some embodiments, a plurality of solid phase carrier agents are or comprise solid phase reversible immobilization (SPRI) agents. In some embodiments, SPRI agents are or comprise Seradyne COOH beads. In some embodiments, an effective amount of an anionic detergent is LiDS in an amount within a range of about 0.1% (w/v) to about 5% (w/v) LiDS. In some certain embodiments, an effective amount of LiDS is within a range of about 0.5% (w/v) to about 3% (w/v) LiDS. In some embodiments, an effective amount of LiDS is about 0.5% (w/v) LiDS, about 0.75% (w/v) LiDS, about 1% (w/v) LiDS, about 1.25% (w/v) LiDS, about 1.5% (w/v) LiDS, about 1.75% (w/v) LiDS, about 2% (w/v) LiDS, about 2.5% (w/v) LiDS, or about 3% (w/v) LiDS.

In some embodiments, data obtained from qPCR is used to determine a level of microbial genomic DNA in a sample of a *Cannabis* plant. In some embodiments, data obtained from qPCR is used to determine a level of live microbial genomic DNA in a sample of a *Cannabis* plant.

In some embodiments, qPCR is multiplexed qPCR.

In some embodiments, provided methods include amplifying at least a portion of polynucleotides of isolated microbial genomic DNA isolated and amplifying at least a portion of polynucleotides from one or both of (i) a control DNA introduced after or substantially at the same time as the step of introducing an anionic detergent and (ii) a control DNA introduced prior to the step of introducing a DNase enzyme. In some embodiments, data obtained from qPCR is used to determine a level of microbial genomic DNA in a sample of a *Cannabis* plant. In some embodiments, data obtained from quantifying amplified polynucleotides is used to determine a level of live and/or dead microbial genomic DNA in a sample of a *Cannabis* plant.

In some embodiments, live and/or dead microbial cells are or include endophytic cells. In some embodiments, live and/or dead microbial cells are or include endophytic bacterial cells and/or endophytic fungal cells. In some embodiments, live and/or dead microbial cells are or include *Aspergillus* cells. In some embodiments, *Aspergillus* cells are or include *Aspergillus ostianus* cells, *Aspergillus fumigatus*, *Aspergillus flavus* cells, *Aspergillus niger* cells, *Aspergillus terreus* cells and/or *Aspergillus sydowii* cells.

In some embodiments, a *Cannabis* plant is a *C. sativa* plant, a *C. indica* plant, or a *C. ruderalis* plant. In some embodiments, *Cannabis* plant matrix is derived from lysed cells of a leaf, stem, and/or root of a *Cannabis* plant. In some embodiments, *Cannabis* plant matrix is derived from *Cannabis* plant cells lysed by homogenization in a liquid broth. In some embodiments, a *Cannabis* plant has been irradiated.

In some embodiments, a method does not include introducing into the sample Proteinase K.

In some embodiments, provided are kits for performing methods of the present disclosure.

Other features of the invention will become apparent in the course of the following descriptions of exemplary embodiments which are given for illustration of the invention and are not intended to be limiting thereof.

These, and other aspects encompassed by the present disclosure, are described in more detail below and in the claims.

BRIEF DESCRIPTION OF THE DRAWING

The Figures described below, that together make up the Drawing, are for illustration purposes only, not for limitation.

FIG. 1: depicts data from a qPCR of genomic DNA with DNase treatment. Samples of *E. coli* genomic test DNA were treated with varying amounts of DNase I, in culture broth at 37° C. for 10 minutes. *Salmonella* genomic tracer DNA was spiked in and both test DNA and tracer DNA were captured using solid phase reversible immobilization (SPRI). As indicated by the accompanying arrows, walking along the bottom of the graph, the left-most line represents data obtained from an *E. coli* amplicon from a sample with no DNase treatment, middle six lines represent data obtained from *Salmonella* amplicons from each of the samples (no DNase treatment, and 5 µL, 10 µL, 15 µL, 20 µL, and 25 µL DNase I treatment), and right most lines represent data obtained from *E. coli* amplicons 5 µL and 10 µL DNase I treatment, followed by the *E. coli* amplicons 15 µL, 20 µL, and 25 µL DNase I treatment. Values are presented in Table 1 below.

FIG. 5: depicts qPCR analysis of samples treated with DNase for varying lengths of time at low LiDs concentrations. Dashed lines represent data obtained from amplification of *E. coli* marker samples and solid gray lines represent data obtained from amplification of *Salmonella* samples. As indicated by the accompanying arrows, walking along the bottom of the graph, the left-most blue and red lines correspond to *E. coli* and *Salmonella* positive controls, respectively, followed by samples with incubation with DNase for varying lengths of time (0, 15, 20, 45, and 60 minutes). Values presented in Table 5 below. Longer incubation with DNase in detergent concentrations common to many PCR buffers results in delayed Cq and thus more DNA digestion. These data obtained by qPCR analyses demonstrate that detergent concentrations often found in PCR reactions are not sufficient to inactivate DNase.

CERTAIN DEFINITIONS

*Cannabis*: As used herein, "*Cannabis*" refers to any plant in the genus *Cannabis*. In some embodiments, "*Cannabis*" refers to a part of, a specific compound from, and/or any product from a *Cannabis* plant (e.g., *C. sativa, C. indica, C. ruderalis*). For example, a "*Cannabis* enzyme" refers to an enzyme from a *Cannabis* plant. Similarly, a "*Cannabis* genome" refers to a genome from a *Cannabis* plant. *Cannabis* includes both "marijuana" and "hemp," two forms of *Cannabis* that are distinguished on the basis of the relative abundances of different cannabinoids. *Cannabis* includes any variety of *Cannabis* species, cultivar of *Cannabis* species, or hybrid between any *Cannabis* species.

Pathogen: As used herein, the terms "pathogen" and "pathogenic" in reference to a bacterium or fungus includes any such organism that is capable of causing or affecting a disease, disorder or condition of a host comprising the organism (e.g., a plant, e.g., a *Cannabis* plant).

Plant part: As used herein, the term "plant part" refers to any part of a plant including but not limited to the embryo, shoot, root, stem, seed, stipule, leaf, petal, flower bud, flower, ovule, bract, trichome, branch, petiole, internode, bark, pubescence, tiller, rhizome, frond, blade, ovule, pollen, stamen, and the like. The two main parts of plants grown in some sort of media, such as soil or vermiculite, are often referred to as the "above-ground" part, also often referred to as the "shoots", and the "below-ground" part, also often referred to as the "roots." Plant part may also include certain extracts such as kief or hash which includes *Cannabis* trichomes or glands.

Polynucleotide: As used herein, the term polynucleotide refers to a polymer of nucleotides. Polynucleotides encompass DNA (single-stranded, double-stranded, linear, covalently closed, and relaxed circular forms), RNA (single-stranded and double-stranded), RNA/DNA hybrids and polyamide nucleic acids (PNAs). In some embodiments, a polynucleotide is or comprises deoxyribonucleic acid (DNA). In some embodiments, a polynucleotide is or comprises ribonucleic acid (RNA). In some embodiments, a polynucleotide is single stranded. In some embodiments, a polynucleotide is double stranded. In some embodiments, a polynucleotide includes both single and double stranded portions. Unless otherwise stated, the term polynucleotide encompasses structures with synthetic backbones, as well as amplification products. In some embodiments, a polynucleotide is or comprises an amplification product.

Primer: The term "primer," as used herein, typically refers to polynucleotides that hybridize in a sequence specific manner to a complementary polynucleotide (e.g., a polynucleotide comprising a target sequence). In some embodiments, a primer will comprise a region of nucleotide sequence that hybridizes to at least 8, e.g., at least 10, at least 15, at least 20, or at least 25 nucleotides of a target polynucleotide (i.e., will hybridize to a sequence of the target polynucleotide). In some embodiments, a primer will comprise a region of nucleotide sequence that hybridizes to at most 60, e.g., at most 50, at most 40, at most 35, at most 30, at most 25, nucleotides of a target polynucleotide. In general, a primer sequence is identified as being either "complementary" (i.e., complementary to the coding or sense strand (+)), or "reverse complementary" (i.e., complementary to the anti-sense strand (−)). In some embodiments, the term "primer" may refer to a polynucleotide that acts as a point of initiation of a template-directed synthesis using methods such as PCR (polymerase chain reaction) under appropriate conditions (e.g., in the presence of four different nucleotide triphosphates and a polymerization agent, such as DNA polymerase in an appropriate buffer solution containing any necessary reagents and at suitable temperature(s)). Such a template directed synthesis is also called "primer extension." For example, a primer pair may be designed to amplify a region of DNA using PCR. Such a pair will include a "forward primer" and a "reverse primer" that hybridize to complementary strands of a DNA molecule and that delimit a region to be synthesized and/or amplified.

Solid phase carrier: As used herein, refers to an entity that is essentially insoluble under any conditions upon which a polynucleotide can be precipitated. Surfaces of solid phase carriers can bind, preferably reversibly, a polynucleotide. Suitable solid phase carriers have sufficient surface area to permit efficient binding of polynucleotides. Suitable solid phase carriers include, but are not limited to, microparticles, particles, fibers, beads and/or supports on which a precipitated polynucleotide can bind, and can embody a variety of shapes. In general, shape of a solid phase carrier maximizes the surface area of the solid phase, and embodies a carrier that is amenable to microscale manipulations. In a some embodiments, a solid phase carrier is paramagnetic, e.g., a paramagnetic microparticle. In some embodiments, a solid phase carrier includes a functional group coated surface. For example, a solid phase carrier can be an amine-coated paramagnetic microparticle, a carboxyl-coated paramagnetic microparticle, or an encapsulated carboxyl group-coated paramagnetic microparticle. In some embodiments, solid phase carrier agents are or comprise solid phase reversible immobilization (SPRI) agents, such as, for example, Seradyne COOH beads.

All literature and similar material cited in this application, including, but not limited to, patents, patent applications, articles, books, and treatises, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls. The section headings used herein are for organizational purposes only and are not to be construed as limiting the subject matter described in any way.

DETAILED DESCRIPTION OF CERTAIN EMBODIMENTS

The disclosure provides, among other things, methods useful for detecting and/or quantifying microbial content of a plant, such as a *Cannabis* plant.

Traditional microbial detection and/or quantification methods relied on culture based plating techniques that suffer from many challenges in the *Cannabis* industry. A primary challenge in the *Cannabis* industry is detecting and/or quantifying certain microbial threats to *Cannabis*, e.g., endophytes (i.e., microbes that live inside the plant). Indeed, endophytes, such as *Aspergillus*, are among the most harmful microbes to *Cannabis*. Endophyte content of a *Cannabis* plant is not easily surveyed without lysing open *Cannabis* cells.

Typical processes for analyzing microbial content of *Cannabis* plants destroy the viability of both plant and microbial cells. Moreover, culture based methods are generally ineffective for detecting endophytic microbes, and predominantly colonies that grow are derived from epiphytes (i.e., microbes that live on the outside of the plant). As a result, plating-based methods under estimate microbial risk by several log orders. (McKernan K. Microbiological examination of nonsterile *Cannabis* products: Molecular Microbial Enumeration Tests and the limitation of Colony Forming Units. Open Science Framework (OSF) (2018) (osf.io/mnwp9/). Quantitative PCR has become a gold standard for microbial detection in food and *Cannabis* safety testing. (McKernan K, et al. *Cannabis* microbiome sequencing reveals several mycotoxic fungi native to dispensary grade *Cannabis* flowers. F1OOOResearch (2015) 4: 1422).

To address microbial threats, many *Cannabis* producers and/or cultivators irradiate plants to inactivate the microbes, which creates a mixture of live and dead microbial cells on and inside the plant. *Cannabis* cultivators and/or producers want to be able to quantify this ratio as it provides guidance on their production process. Excessive irradiation or sterilization can lower the quality of the product and alter the terpene profile of the *Cannabis* plant. (Hazekamp A. Evaluating the Effects of Gamma-Irradiation for Decontamination of Medicinal *Cannabis*. Frontiers in pharmacology (2016) 7:108).

Quantitative PCR ("qPCR") can be used to quantify microbial content, however, one drawback to qPCR is that it is generally unable to discern free DNA or DNA of dead microbial cells from DNA inside live cells and/or organisms. While several intercalating dyes exist that can distinguish live and dead microbial cells, these dyes are associated with a number of limitations. For example, intercalating dyes for live-dead analysis can be toxic, cumbersome, and/or have variable permeability into different cell membranes and cell walls. (Loozen G, et al. Live/dead real-time polymerase chain reaction to assess new therapies against dental plaque-related pathologies. Molecular oral microbiology (2011) 4:253-61).

Methods for Characterizing Microbial Content

The present disclosure provides useful methods for characterizing microbial content of in a plant (e.g., a *Cannabis* plant). The present disclosure encompasses the recognition that DNase digestion (e.g., of free DNA or DNA of dead cells (e.g., dead cells are not intact, but rather, undergo apoptosis, necrosis, or other forms of lysis/degradation, and therefore DNA from dead cells is accessible and/or released, i.e., free)), enables analysis of quantification of polynucleotides from live microbial cells.

Among other things, the present disclosure identifies a problem with certain existing methods for analyzing microbial content that include DNase digestion in that these methods have inefficient and/or ineffective means for inactivating DNase, such as enzymatic inactivation by Proteinase K (PK). Thus, existing methods fail to provide sufficiently robust and straightforward means for precise quantification of live microbial cells.

The present disclosure recognizes that existing methods fail to provide sufficiently robust and straightforward means for DNase inactivation and so fail to enable precise quantification of live microbial cells in a sample. For example, Villarreal et al. describes an approach that utilizes DNaseI to remove free circulating DNA to calculate live bacterial levels in drinking water biofilms. (Villarreal J V, et al. DNase I and Proteinase K eliminate DNA from injured or dead bacteria but not from living bacteria in microbial reference systems and natural drinking water biofilms for subsequent molecular biology analyses. Journal of microbiological methods (2013) 3:161-9). However, this approach has its own limitations as DNaseI must be fully inactivated before cell lysis or it will digest the live DNA or PCR primers in downstream analysis. To address this, Villarreal et al. used Proteinase K ("PK") to inactivate DNaseI; however, this presented its own problems in that PK is an even more difficult enzyme to inactivate than DNaseI. PK activity is often enhanced in a wide range of cell lysis solutions like SDS, GuHCl and sarcosyl. Generally, PK inactivation step requires a 55-70° C. incubation step. While this temperature may inactivate DNases, it is also known to lyse open *E. coli* and *Salmonella* cells. (Ebrahimi A, et al. Analyzing Thermal Stability of Cell Membrane of *Salmonella* Using Time-Multiplexed Impedance Sensing. Biophysical Journal (2018) 114(3):609-18). Thus, in the method of Villarreal, the PK enzymes race to destroy DNase enzymes faster than the DNaseI digests the DNA from newly lysed live cells. Another drawback to the Villarreal method is that PK requires a 90° C. for 10 minutes to be fully inactivated. Lysis steps near boiling temperatures add additional complexity to the workflow.

Bio-Rad teaches a similarly deficient method of DNase inactivation that uses a 30 minute 70° C. PK step. This slow inactivation not only runs the risk of lysing cells while the DNaseI is still active, but also is believed to be a reversible inactivation of DNaseI. www.bio-rad.com/webroot/web/pdf/fsd/literature/10000058391.pdf Liao et al. describe SDS deactivation of DNase A, but this method of DNase inactivation is reversible with reagents commonly found in DNA purification kits (e.g., guanidinium chloride). (Liao T. Reversible inactivation of pancreatic deoxyribonuclease A by sodium dodecyl sulfate. Removal of COOH-terminal residues from the denatured protein by carboxypeptidase A. The Journal of Biological Chemistry (1975) 250(10):3831-6).

Ashram et al. provides a three-pronged approach for inhibiting DNaseI using high salt (NaCl), strong chelators (EDTA), and SDS. (El-Ashram S, et al., Nucleic acid protocols: Extraction and optimization. Biotechnology Reports (2016) 12:33-9; cshprotocols.cshlp.org/content/2010/6/pdb.recl2229.full). However, while high salt will "salt out" DNA from enzymes, it does not inactivate the enzyme and the salt will need to be removed for qPCR or subsequent enzymatic assays. Strong chelators will temporarily inhibit enzymatic activity, but this inhibition is also reversible once the chelators are removed for future enzymatic amplification. Thus, this "triple protection" approach is really three temporary inhibitors, all of which must be removed prior to PCR and thus reactivating the DNaseI activity. Moreover, techniques that reversibly inhibit DNase also tend to lyse cells, thereby making live-dead analysis with DNaseI complicated or even impracticable.

The present disclosure addresses these deficiencies with existing methods by leveraging DNase digestion with subsequent DNase inactivation by detergent-mediated lysis and polynucleotide capture. To overcome the limitations of the long 30 minute thermal inactivation of DNaseI or PK inactivation of DNaseI described by Bio-Rad and Villarreal, respectively, the present disclosure provides a method that includes chemical inactivation that is also compatible with polynucleotide capture. Methods of the present disclosure do not include introducing PK into the sample. Thus, provided methods eliminate enzymatic inactivation of DNase (e.g., no PK treatment).

The present disclosure provides methods that differ from prior methods in that, by substantially simultaneously inactivating DNase and purifying cellular DNA, said methods involve fewer steps and reduce heat exposure, thereby greatly simplifying and improving accuracy of the methods.

Moreover, provided methods further employ tracer molecules (e.g., control DNA) that assist in real-time quantification of DNase inactivation. Thus, provide methods offer a robust and simplified means to accurately analyze microbial content of plant samples (e.g., *Cannabis* samples) and can quantify both live and dead microbial content.

In some embodiments, a method for determining a level of one or more live microbes in a sample of a *Cannabis* plant includes: (a) introducing a DNase enzyme into a sample comprising (i) *Cannabis* plant matrix derived from lysed cells of a *Cannabis* plant and (ii) live microbial cells comprising microbial genomic DNA; (b) introducing an anionic detergent into the sample, wherein the anionic detergent is in an amount effective to inactivate the DNase enzyme in the sample and lyse the live microbial cells in the sample, thereby releasing microbial genomic DNA from the microbial cells; (c) contacting the sample with a plurality of polynucleotide capture agents, wherein each polynucleotide capture agent binds one or more polynucleotides from the microbial genomic DNA and/or control DNA in the sample; (d) isolating the plurality of polynucleotide capture agents, thereby isolating polynucleotides from the microbial genomic DNA and/or control DNA in the sample; and (e) amplifying at least a portion of polynucleotides from the microbial genomic DNA isolated in step (d).

In some embodiments, "sample(s)" refer to separately procured samples. In some embodiments, evaluation of separate samples includes evaluation of samples from the same *Cannabis* plant (e.g., sampling of different portions of one or more plant parts from the same plant) or from different *Cannabis* plants.

DNase enzymes suitable for us in methods of the present disclosure are known in the art and commercially available. In some embodiments, a DNase enzyme is a DNaseI enzyme or a DNaseA enzyme. In some certain embodiments, a DNase enzyme is a DNaseI enzyme.

In some embodiments, data obtained by amplifying at least a portion of polynucleotides from the microbial genomic DNA is used to determine a level of microbial genomic DNA from live microbes in a sample of a *Cannabis* plant. In some embodiments, a sample of *Cannabis* plant matrix further comprises free microbial DNA from dead microbial cells. In some embodiments, data obtained by amplifying microbial polynucleotides (e.g., genomic DNA and/or free microbial DNA) is used to determine a live-dead ratio microbial cells in a sample of a *Cannabis* plant.

In some embodiments, a method includes amplifying at least a portion of polynucleotides from control DNA.

In some embodiments, methods of the present disclosure are suitable for automation. In some embodiments, two or more steps of a method of the present disclosure are suitable for automation. In some embodiments, reaction steps for determining a level of one or more live microbes in a sample of *Cannabis* plant matrix (e.g., steps of introducing, contacting, isolating and/or amplifying) are automated and/or suitable for automation.

Control DNA

Methods of the present disclosure include introducing one or more control DNA (alternatively referred to as tracer DNA, e.g., spiking with tracer DNA) to promote accuracy.

In some embodiments, methods of the present disclosure include introducing a known quantity of control DNA after or substantially at the same time as the step of introducing an anionic detergent. Introduction of such a control DNA provides a control for assessing inactivation of DNase.

In some embodiments, steps of introducing an anionic detergent and introducing a known quantity of control DNA into a sample are performed within 5 minutes of each other, within 2 minutes of each other, within 1 minute of each other, within less than 30 seconds of each other, within less than 15 seconds of each other, or substantially simultaneously.

In some certain embodiments, the present disclosure provides LiDS combined with SPRI and combined with a post inactivation introduction of control DNA (e.g., spike-in gDNA tracer DNA).

In some embodiments, a method of the present disclosure includes introducing a known quantity of control DNA into a sample prior to introducing a DNase enzyme. Introduction of such a control DNA provides a control for incomplete DNase enzyme-mediated digestion.

In some embodiments, a method of the present disclosure includes both (i) introducing a control DNA after or substantially at the same time as the step of introducing an anionic detergent and (ii) introducing a control DNA prior to the step of introducing a DNase enzyme. Control DNA introduced at each of these points are not the same (i.e., is different).

In some embodiments, a control DNA is genomic DNA.

Polynucleotide Extraction and Capture

The present disclosure encompasses the recognition that an anionic detergent both lyses live microbial cells, thereby making DNA accessible, and inactivates DNase enzymes. Methods of the present disclosure combine this microbial cell lysis, DNase inactivation and polynucleotide capture enable to robust and reliable quantification of live microbial content.

In some embodiments, an anionic detergent is sodium dodecyl sulphate (SDS). In some embodiments, an anionic detergent is lithium dodecyl sulphate (LiDS). In some embodiments, an effective amount of LiDS is within a range of about 0.1 (w/v) % to about 5 (w/v) % LiDS. In some certain embodiments, an effective amount of LiDS is in a total amount within a range of about 1 (w/v) % to about 4 (w/v) % LiDS.

Microbial genomic DNA released by contacting a sample with an anionic detergent is coupled with polynucleotide extraction and capture. For a general description of techniques and considerations for polynucleotide extraction and optimization, see, El-Ashram, et al., Nucleic acid protocols: Extraction and optimization, Biotechnology Reports (2016) 12:33-39.

In some embodiments, steps of: introducing an anionic detergent and contacting a sample with a plurality of polynucleotide capture agents are performed within 5 minutes of each other, within 2 minutes of each other, within 1 minute of each other, within less than 30 seconds of each other, within less than 15 seconds of each other, or substantially simultaneously.

In some embodiments, a plurality of polynucleotide capture agents are or comprise solid phase carrier agents. In some embodiments, a plurality of polynucleotide capture agents are or comprise solid phase reversible immobilization (SPRI) agents. In some embodiments, SPRI agents are or comprise Seradyne COOH beads.

In some embodiments, methods of the present disclosure include solid phase reversible immobilization (SPRI) of polynucleotides. (DeAngelis M M, Wang D G, Hawkins T L. Solid-phase reversible immobilization for the isolation of PCR products. Nucleic acids research. 1995 Nov. 25; 23(22):4742-3). SPRI captures microbial DNA and tracer control DNA onto a solid phase and eliminates the enzyme from solution rendering them inaccessible to the DNase.

In some embodiments, the method includes introducing a polynucleotide precipitating reagent, e.g., polyethylene glycol, in a concentration that results in the binding of polynucleotides to the solid phase carrier (e.g., SPRI agents).

In some certain embodiments, methods of the present disclosure include introducing into a sample LiDS combined with SPRI-mediated polynucleotide capture. In some embodiments, methods further include with a post inactivation introduction of control DNA (e.g., spike-in of gDNA tracer).

Methods described herein can be combined with polynucleotide purification techniques known in the art.

Polynucleotide Amplification Methods

In some embodiments, a method includes amplification of one or a plurality of sequences in a sample that comprises polynucleotide from microbial cells within a *Cannabis* plant and/or a *Cannabis* plant.

In some embodiments, polynucleotide amplification in the methods of the present disclosure include polymerase chain reaction (PCR), such as quantitative polymerase chain reaction and real-time quantitative polymerase chain reaction (collectively, qPCR). qPCR determines, the fractional cycle number ($C_t$) at which the well's rising fluorescence (proportional to product formation) crosses a set threshold that is several standard deviations above the baseline fluorescence (Higuchi, et al., (1993) Kinetic PGR analysis: real-time monitoring of DNA amplification reactions, *Biotechnology* (NY), 11: 1026-1030, which is incorporated by reference in its entirety). The $C_t$ versus log (amount of input target DNA) plot is linear, allowing relative quantitation of unknowns by comparison to a standard curve derived from amplifying, in the same plate, serial dilutions of a reference DNA sample.

In some embodiments, a method further includes quantifying amplified polynucleotides. In some embodiments, data obtained from quantifying amplified polynucleotides is used to determine a level of microbial genomic DNA in a sample of a *Cannabis* plant. In some embodiments, data obtained from quantifying amplified polynucleotides is used to determine a level of live microbial genomic DNA in a sample of a *Cannabis* plant.

In some embodiments, a step of amplifying is by or includes quantitative PCR (qPCR). In some embodiments, qPCR is multiplexed qPCR.

In some embodiments, amplification is by probe-based qPCR. With probe-based qPCR many targets can be detected simultaneously in each sample. There are several types of probe designs available, but the most common type is a hydrolysis probe, which incorporates use of a fluorophore and quencher. Fluorescence resonance energy transfer (FRET) prevents emission of a fluorophore via a quencher while the probe is intact. However, during the PCR reaction, the probe is hydrolyzed during primer extension and amplification of the specific sequence it is bound to. The cleavage of the probe separates the fluorophore from the quencher and results in an amplification-dependent increase in fluorescence. Thus, a fluorescence signal from a probe-based qPCR reaction is proportional to the amount of the probe target sequence present in a sample.

In some embodiments, data obtained by quantitative PCR (qPCR) (e.g., multiplexed qPCR) is used to determine a level of microbial genomic DNA from live microbes in a sample of a *Cannabis* plant.

In some embodiments, a sample of *Cannabis* plant matrix further comprises free microbial DNA from dead microbial cells. In some embodiments, data obtained by qPCR (e.g., multiplexed qPCR) is used to determine a live-dead ratio microbial cells in a sample of a *Cannabis* plant.

In some embodiments, methods of the present disclosure include amplifying at least a portion of polynucleotides from a control DNA (e.g., tracer DNA).

In some embodiments, provided methods include amplifying at least a portion of polynucleotides from a control DNA introduced after or substantially at the same time as the step of introducing an anionic detergent (e.g., a control for assessing inactivation of DNase).

In some embodiments, provided methods include amplifying at least a portion of polynucleotides from a control DNA introduced prior to the step of introducing a DNase enzyme (e.g., control for incomplete DNase enzyme-mediated digestion).

In some embodiments, provided methods include amplifying at least a portion of polynucleotides from both (i) a control DNA introduced after or substantially at the same time as the step of introducing an anionic detergent and (ii) a control DNA introduced prior to the step of introducing a DNase enzyme, where the control DNA introduced at (i) and (ii) are different.

In some embodiments, provided methods include amplifying at least a portion of polynucleotides of isolated microbial genomic DNA isolated and amplifying at least a portion of polynucleotides from one or both of (i) a control DNA introduced after or substantially at the same time as the step of introducing an anionic detergent and (ii) a control DNA introduced prior to the step of introducing a DNase enzyme.

In some embodiments, amplifying is by qPCR (e.g., multiplexed qPCR). In some embodiments, data obtained from quantifying amplified polynucleotides is used to determine a level of microbial genomic DNA in a sample of a *Cannabis* plant. In some embodiments, data obtained from quantifying amplified polynucleotides is used to determine a level of live microbial genomic DNA in a sample of a *Cannabis* plant.

In some embodiments, amplifying at least a portion of polynucleotides includes amplifying a sequence corresponding to a gene sequence or portion thereof of a control DNA.

In some embodiment, provided methods include amplifying at least a portion of polynucleotides of a *Cannabis* plant. In some embodiments, amplifying at least a portion of polynucleotides includes amplifying a sequence corresponding to a gene sequence or portion thereof of a *Cannabis* plant.

In some embodiments, provided methods include amplification of a 16S sequence or portion thereof. In some embodiments, amplified polynucleotides of 16S sequence or portion thereof provides an estimate of total aerobic count.

In some embodiments, provided methods include amplification of a ITS2 sequence or portion thereof. In some embodiments, amplified polynucleotides of ITS2 sequence or portion thereof provides an estimate of fungal cells.

In some embodiments, provided methods use commercial available kits for detecting control and/or microbial DNA. For example, Medicinal Genomics *E. coli* and *Salmonella* Multiplex qPCR kit (#420313).

*Cannabis* Plants

*Cannabis* plants for use in accordance with the methods of the present disclosure may be, for example, a *C. sativa* plant and/or a *C. indica* plant.

Sub-species of *Cannabis* plants are commonly distinguished based on morphology of a *Cannabis* plant. Additionally or alternatively, *Cannabis* plants can be characterized by production of one or more chemical metabolites (e.g., cannabinoids). In some embodiments, a *Cannabis* plant is characterized as having a specified level (e.g., high/low) of one or more cannabinoids, flavonoids and/or terpenes.

Cannabinoids are terpenophenolic secondary metabolites, produced by *Cannabis* plants in the sessile and stalked trichomes. Trichomes are generally abundant on the inflorescences of a *Cannabis* plant, present in lower number on leaves, petioles and stems, and generally absent on roots and seeds. In some embodiments, a *Cannabis* plant for use in a method of the present disclosure may include any plant part, such as, for example, a bloom, leaf, petiole, stem, root and/or seed.

As an annual, *Cannabis* plants follow a solar cycle consisting of two basic stages often referred to as vegetative, and bloom (flowering). Cannabinoid synthesis occurs predominantly in bloom (flowering) phase. In some embodiments, a *Cannabis* plant for use in a method of the present disclosure is in a vegetative state. In some embodiments, a *Cannabis* plant for use in a method of the present disclosure is in a flowering state.

In some embodiments, *Cannabis* plant matrix for use in accordance with the methods of the present disclosure is derived from lysed cells of a leaf, stem, and/or root of a *Cannabis* plant. In some embodiments, *Cannabis* plant matrix is derived from *Cannabis* plant cells lysed by homogenization in a liquid broth.

In some embodiments, a *Cannabis* plant has undergone a sterilization treatment, such as, for example, irradiation. In some embodiments, a *Cannabis* plant has been irradiated. In some embodiments, *Cannabis* plant matrix for use in accordance with the methods of the present disclosure is derived from lysed cells of a *Cannabis* plant that has been irradiated. In some embodiments, *Cannabis* plant matrix is derived from lysed cells of a leaf, stem, and/or root of a *Cannabis* plant that has been irradiated. In some embodiments, *Cannabis* plant matrix is derived from *Cannabis* plant cells lysed by homogenization in a liquid broth.

Endophytes

The present disclosure provides methods useful to determining a level of one or more endophytic microbes. Plant endophytes are a group of microorganisms that reside within the living plant cells. Current methods of determining endophyte content of a *Cannabis* plant are limited because endophytes are not easily surveyed without lysing open *Cannabis* cells.

In some embodiments, a sample of a *Cannabis* plant includes endophytes. In some embodiments, a sample of a *Cannabis* plant includes cells of one or more live endophytes. In some embodiments, a sample of a *Cannabis* plant includes cells of one or more dead endophytes.

In some embodiments, a sample of a *Cannabis* plant includes live endophyte cells and dead endophyte cells, where about 99%, 95%, 90%, 85%, 80%, 75%, 70%, 65%, 60%, 55%, 50%, 45% 40%, 35%, 30%, 25%, 20%, 15%, 10%, 5%, 1% or <1% of the endophyte cells are live endophyte cells. In some embodiments, a sample of a *Cannabis* plant includes live endophyte cells and dead endophyte cells, where about 99%, 95%, 90%, 85%, 80%, 75%, 70%, 65%, 60%, 55%, 50%, 45% 40%, 35%, 30%, 25%, 20%, 15%, 10%, 5%, or 1% of the endophyte cells are dead endophyte cells.

In some embodiments, a sample of a *Cannabis* plant includes live and dead microbial cells from one or more endophytes, where a live to dead ratio of a microbe is within a range of about 1000:1 to about 1:1000, about 500:1 to about 1:500, about 100:1 to about 1:100, about 50:1 to about 1:50, about 25:1 to about 1:25, about 10:1 to about 1:10, about 5:1 to about 1:5, about 4:1 to about 1:4, about 3:1 to about 1:3, or about 2:1 to about 1:2.

In some embodiments, a sample of a *Cannabis* plant includes live and dead microbial cells from one or more endophytes, where a ratio of live to dead ratio of a microbe is about 1000:1, about 500:1, about 100:1, about 50:1, about 25:1, about 10:1, about 5:1, about 4:1, about 3:1, about 2.5:1, about 2:1, about 1.5:1, about 1:1, about 1:1.5, about 1:2, about 1.2.5, about 1:3, about 1:4, about 1:5, about 1:10, about 1:25, about 1:50, about 1:100, about 1:500, or about 1:1000.

In some embodiments, endophyte cells are or include endophytic bacterial cells and/or endophytic fungal cells.

In some embodiments, endophytes include pathogenic endophytes. In some embodiments, endophyte cells are or include pathogenic endophytic bacterial cells and/or pathogenic endophytic fungal cells.

In some embodiments, endophytes include symbiotic endophytes. In some embodiments, endophyte cells are or include symbiotic endophytic bacterial cells and/or symbiotic endophytic fungal cells. In some embodiments, a symbiotic endophyte confers one or more beneficial properties on a *Cannabis* plant.

In some embodiments, a sample of a *Cannabis* plant includes live and/or dead microbial cells that are or include endophytic bacterial cells. In some embodiments, endophytic bacterial cells are or include bacterial cells of the genera *Pseudomonas, Pantoea*, and/or *Bacillus*.

In some embodiments, a sample of a *Cannabis* plant includes live and/or dead microbial cells that are or include endophytic fungal cells. In some embodiments, endophytic fungal cells are or include fungal cells of the genera *Aspergillus, Aureobasidium, Alternaria*, and/or *Cochliobolus*.

In some certain embodiments, a sample of a *Cannabis* plant includes live microbial cells that are or include *Aspergillus* cells. In some embodiments, a sample of a *Cannabis* plant includes dead microbial cells that are or include *Aspergillus* cells. In some embodiments, a sample of a *Cannabis* plant includes live microbial cells and dead microbial cells that are or include *Aspergillus* cells. In some embodiments, pathogenic endophyte cells for analysis by methods of the present disclosure are or include *Aspergillus* cells. In some embodiments, *Aspergillus* cells are or include *Aspergillus ostianus* cells, *Aspergillus fumigatus*, *Aspergillus flavus* cells, *Aspergillus niger* cells, *Aspergillus terreus* cells and/or *Aspergillus sydowii* cells.

*Aspergillus* is dangerous to immunocompromised individuals, in whom the airborne spores can lead to a debilitating invasive infection, called aspergillosis, that oftentimes proves to be fatal. For these individuals, aspergillosis begins when the spores are inhaled through the mouth where the fungus finds ample breeding opportunity in the lungs that can quickly lead to infection. Once the infection takes hold it can cause serious, and sometimes fatal, bleeding in the lungs. The practice of ingesting *Cannabis* by smoking does not generally reach temperatures required to effectively eliminate *Aspergillus* spores. When these spores are present in a *Cannabis* plant and smoked they pose a serious risk of infection.

*Aspergillus* appears to have poor viability on various culture mediums and plating-based methods can have a 100-1000 fold under-estimate of *Aspergillus* CFUs compared to qPCR. (McKernan K, et al. Metagenomic analysis of medicinal *Cannabis* samples; pathogenic bacteria, toxigenic fungi, and beneficial microbes grow in culture-based yeast and mold tests. F1000Research (2016) 5:2471). Accordingly, methods of disclosure satisfy a previously unmet need for robust and reliable methods to quantify *Aspergillus* content in *Cannabis* plants.

In some embodiments, a method of the present disclosure can be used to determine that a *Cannabis* plant has a suitably low level of *Aspergillus* cells to be safe for human consumption. In some embodiments, a method of the present disclosure can be used to determine that a *Cannabis* plant is substantially free of live *Aspergillus* cells.

Applications

In some instances, methods disclosed herein can be used to confirm quality and/or safety of a plant for consumption, e.g., a *Cannabis* plant. For example, methods can include qualifying a *Cannabis* plant if qualifying microbial levels (e.g., predefined levels of one or more microbes) are met; thereby evaluating and/or producing (e.g., manufacturing) a plant product (e.g., a *Cannabis* plant product). In some embodiments, methods include quantifying live microbial levels for one or more live microbes.

Methods of the present disclosure have a variety of applications and include, e.g., quality control at different stages of manufacture and/or production, analysis of a *Cannabis* plant prior to and/or after completion of manufacture and/or production (e.g., prior to or after distribution to a product production and/or packaging facility), prior to or after release into commerce (e.g., before distribution to a distributor, consumer, or other end-user).

In some embodiments, provided methods are useful for determining if a *Cannabis* plant is safe for public distribution, where said methods comprise determining a level of one or more live microbes in a sample of a *Cannabis* plant.

In some embodiments, if a determined level of one or more live microbes is below a threshold value, then processing the plant as a *Cannabis* product. In some embodiments, if a determined level of one or more live microbes is above a threshold value, then taking alternative action, such as, for example, disposing of a *Cannabis* plant, classifying a *Cannabis* plant for disposal, and/or further sterilization (e.g., irradiation) of a *Cannabis* plant.

In some embodiments, provided methods are useful for selection of a *Cannabis* plant for processing, where said methods comprise determining a level of one or more live microbes in a sample of a *Cannabis* plant. In some embodiments, if a determined level of one or more live microbes is below a threshold value, then processing the plant as a *Cannabis* product. In some embodiments, if a determined level of one or more live microbes is above a threshold value, then taking alternative action, such as, for example, disposing of a *Cannabis* plant, classifying a *Cannabis* plant for disposal, and/or further sterilization (e.g., irradiation) of a *Cannabis* plant.

In some embodiments, provided methods are useful for characterizing sterilization efficiency and/or progress of *Cannabis* plant, where said methods comprise determining a level of one or more live microbes in a sample of a *Cannabis* plant.

In some embodiments, provided methods are useful for characterizing health of *Cannabis* plant, where said methods comprise determining a level of one or more symbiotic and/or beneficial live microbes in a sample of a *Cannabis* plant.

Evaluations from methods described herein are useful for guiding, controlling or implementing a number of activities or steps in the process of making, distributing, and monitoring and providing for the safe and efficacious use of a *Cannabis* plant. Thus, in some embodiments, e.g., whether a criterion is met, e.g., a qualifying level of one or more microbes, a decision or step is taken. For example, based on the result of a determination of whether a level of one or more microbial cells are present, a method can further comprise one or both of the decision to take the step and/or carrying out the step itself. For example, the step can comprise one in which a plant (e.g., *Cannabis* plant) is: classified; selected; accepted or discarded; released or processed into a product; rendered unusable for commercial release; subjected to further sterilization (e.g., the plant may undergo a repetition of a previous process step or subjected to a corrective process); packaged; shipped; released into commerce; sold or offered for sale; or delivered to an end-user.

Methods described herein may include making a decision: as to whether a *Cannabis* plant released or processed into a product; as to whether a *Cannabis* plant may be further sterilized; and/or that the *Cannabis* plant is not suitable for consumption.

The disclosure is further illustrated by the following examples. The examples are provided for illustrative purposes only. They are not to be construed as limiting the scope or content of the disclosure in any way.

EXEMPLIFICATION

The examples below describe development of superior methods for quantifying live microbial content of plant samples (e.g., *Cannabis* plant samples). Specifically, methods of quantifying polynucleotides that leverage DNase digestion are described, where DNase inactivation is accomplished by detergent-mediated lysis and polynucleotide capture.

As described above, there are challenges with quantifying for live microbial content related to inactivation of DNase enzymes. Existing methods have limitations including (1) additional enzymatic steps (e.g., PK treatment), (2) prolonged heat exposure, and/or (3) reversible inactivation, all of which complicate and/or impair the analysis.

The present disclosure provides superior methods of characterizing microbial content that leverage DNase digestion with subsequent DNase inactivation by detergent-mediated lysis and polynucleotide capture. The present disclosure provides the insight that DNase activation can be accomplished by detergent-mediated inactivation and polynucleotide capture. This novel approach is more effective than prior methods in that by simultaneously purifying cellular DNA, it greatly simplifies and more reliably inactivates DNase, thereby improving accuracy. Thus, provide methods offer a robust and simplified means to analyze microbial content of plant samples (e.g., *Cannabis* samples) and can accurately quantify both live and dead microbial content.

Example 1: Characterization DNase Inactivation with Model Genomic DNA

This example describes development of superior methods for quantifying live microbial content of plant samples, such as from a *Cannabis* plant. Specifically, the present example with model genomic DNA demonstrates DNase inactivation by detergent-mediated lysis and polynucleotide capture.

To assess the efficiency DNAse inactivation, model genomic DNA was treated with DNase enzyme and subsequently treated anionic detergent and polynucleotide capture.

Model genomic DNA (e.g., 1 ng of *E. coli* genomic DNA (gDNA)(ATCC #8739D-5)) was combined with 285 µL of Tryptic Soy Broth (TSB) and 28.5 µL of 10× DNaseI buffer is added (New England Biolabs). Varying amounts of DNaseI (0 µL, 5 µL, 10 µL, 15 µL, 20 µL, 25 µL of 20 µg/mL DNaseI) were incubated with the culture for 10 minutes at 37° C.

Simultaneous addition of anionic detergent (15 µL of 1% LiDs) and polynucleotide capture agents (300 µL of Ampure (Beckman Genomics)) were added to chemically inactivate the DNase. Sample was tip mixed thoroughly, placed on a magnet plate for 5 minutes and washed twice with 200 µL of 70% ethanol. Isolated DNA is eluted in 50 µL of ddH20 and control DNA (1 ng of *Salmonella* gDNA (ATCC #700720D)) was spiked into the sample to assess residual DNaseI activity. Samples were then amplified using Medicinal Genomics *E. coli* and *Salmonella* Multiplex qPCR kit (#420313).

Exemplary methods include a multiplexed quantitative PCR assay that targets both the microbial DNA and the control DNA. If the DNaseI inactivation is complete, there should be substantially no decrease in the quantity of control DNA (i.e., tracer DNA) compared to the microbial DNA.

As shown in Table 1 below, DNaseI treatment and subsequent exemplary inactivation with anionic detergent (LiDS) and polynucleotide capture (SPRI treatment) robustly inactivated DNase. DNaseI negative samples have a Cq of 21.95. Varying amounts of DNaseI demonstrated a 12Cq (5 µL DNaseI) to 14Cq (25 µL DNaseI). Control *Salmonella* gDNA showed limited range of Cq dispersion (26.06 to 28.26 Cq). Since there was a slight trend with increasing DNaseI levels and *Salmonella* Cq, samples were further incubated for 6 hours to assess if this trend was time sensitive with further enzyme exposure time.

TABLE 1 qPCR of genomic DNA following DNase treatment and inactivation by detergent-mediated lysis and polynucleotide capture

| Sample | Target | Ct | Target | Ct |
|---|---|---|---|---|
| 0 µL DNaseI | *E. coli* | 21.95 | *Salmonella* | 26.06 |
| 5 µL DNaseI | *E. coli* | 34.08 | *Salmonella* | 26.78 |
| 10 µL DNaseI | *E. coli* | 33.96 | *Salmonella* | 27.20 |
| 15 µL DNaseI | *E. coli* | 36.08 | *Salmonella* | 28.00 |
| 20 µL DNaseI | *E. coli* | 35.70 | *Salmonella* | 27.43 |
| 25 µL DNaseI | *E. coli* | 36.46 | *Salmonella* | 28.26 |
| Positive Control | *E. coli* | 13.23 | *Salmonella* | 14.13 |
| NTC | *E. coli* | ND | *Salmonella* | ND |

To further interrogate DNaseI inactivation, samples were incubated for an additional 6 hours. As shown in Table 2 below, near identical Cqs (1.8 Cq variance) were observed suggesting complete deactivation in a simple one enzyme step combined with chemical deactivation of the enzyme.

TABLE 2 qPCR of genomic DNA after a further 6 hour incubation

| Sample | Target | Ct | Target | Ct |
|---|---|---|---|---|
| 0 µL DNaseI | *E. coli* | 21.90 | *Salmonella* | 26.18 |
| 5 µL DNaseI | *E. coli* | 34.16 | *Salmonella* | 26.47 |
| 10 µL DNaseI | *E. coli* | 34.32 | *Salmonella* | 27.20 |
| 15 µL DNaseI | *E. coli* | 36.03 | *Salmonella* | 27.84 |
| 20 µL DNaseI | *E. coli* | 37.40 | *Salmonella* | 27.49 |
| 25 µL DNaseI | *E. coli* | 36.11 | *Salmonella* | 28.04 |
| Positive Control | *E. coli* | 13.10 | *Salmonella* | 14.34 |
| NTC | *E. coli* | ND | *Salmonella* | ND |

Figure 1:
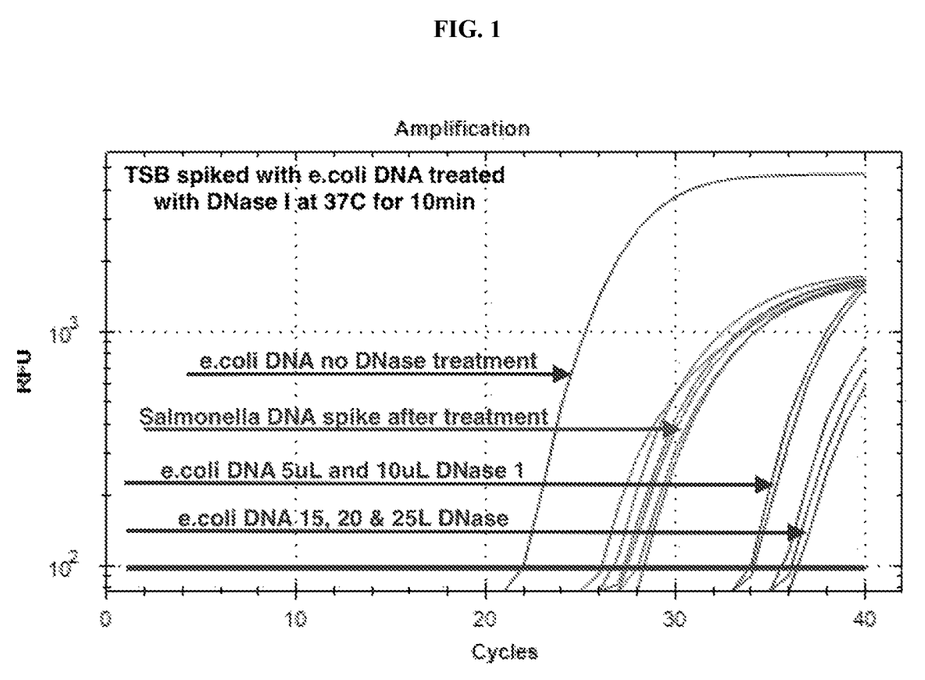

As shown in FIG. 1 and Table 1 and Table 2 above, *E. coli* gDNA was reduced by 12-14 Cqs which equates to a 16,384 fold reduction in free DNA. In contrast, the Bio-Rad method was reported to only show a 6 Cq reduction in DNA and failed to demonstrate that the high temperature incubation with PK did not lyse any cells. Moreover, in the present example, *Salmonella* control DNA Cq was uncorrelated with DNaseI enzyme levels, indicating substantially complete chemical deactivation of DNaseI.

This data demonstrates that detergent-mediated lysis and polynucleotide capture can effectively inactivate a DNase enzyme and permit simultaneous isolation for DNA quantification methods.

Example 2: Characterization DNase Inactivation with Samples of *Cannabis* Matrix Various *Cannabis* components (e.g., terpenoids and flavonoids) have been reported to inhibit DNA polymerases, and therefore, may also have an inhibitory effect on DNase activation and inactivation. (Mizushina Y, et al. Flavonoid glycoside: a new inhibitor of eukaryotic DNA polymerase alpha and a new carrier for inhibitor-affinity chromatography. Biochemical and biophysical research communications. 2003 Feb. 7; 301(2):480-7. Anusuya S and Gromiha M M. Structural basis of flavonoids as dengue polymerase inhibitors: insights from QSAR and docking studies. Journal of biomolecular structure & dynamics. 2017 Dec. 29: 1-12).

The present example demonstrates that an exemplary method of the present disclosure effectively inactivates DNase in the presence of *Cannabis* matrix.

*Cannabis* matrix samples were each prepared by combining 0.5 g of hemp flower with 7,029 µL of TSB buffer and 71 µL of an overnight *E. coli* culture and well mixed. *Cannabis* matrix sample was homogenized for 1 minute and 1 mL of *Cannabis* matrix aliquoted into a separate tube for each of four samples.

Tube 1: 100 µL of DNase 10× buffer was added along with 5 µL of *Salmonella* DNA at a concentration of 2 ng/µL.

Tube 2: 100 µL of DNase 10× buffer was added along with 20 µL of DNaseI enzyme and 5 µL of *Salmonella* DNA at a concentration of 2 ng/µL.

Tube 3: 100 µL of DNase 10× buffer was added along with 20 µL of DNaseI enzyme and 10 µL of *Salmonella* DNA at a concentration of 2 ng/µL.

Tube 4: 100 µL of DNase 10× buffer was added along with 20 µL of DNaseI enzyme and 15 µL of *Salmonella* DNA at a concentration of 2 ng/µL.

Figure 2:
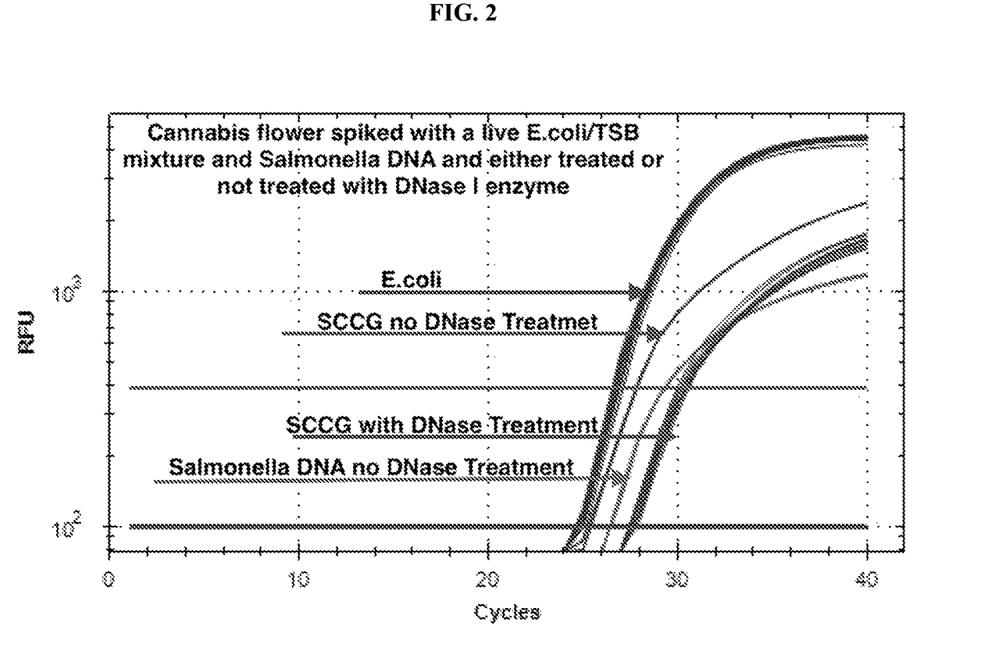
FIG. 2: depicts data from a triplex qPCR analysis to determine a level of DNase inactivation in samples with live *E. coli* in *Cannabis* matrix (i.e., hemp flower and buffer). As indicated by the accompanying arrows, walking along the bottom of the graph, the left-most lines represent data obtained from amplification of *E. coli* marker samples, the next line immediately to the right represents data obtained from amplification of a hemp Single Copy *Cannabis* Gene (SCCG) sample without DNase treatment, the next line to the right represents data obtained from amplification of *Salmonella* sample without DNase treatment, and right-most lines represent data obtained from amplification of hemp SCCG samples treated with DNase. Values are presented in Table 3 below.

All four tubes were incubated for 10 minutes at 37° C., followed by addition of 50 µL of 10% LiDs (w/v) and incubation at room temperature for 2 minutes. Tubes were then spun for 30 seconds and 200 µL of sample was removed from each tube in triplicate and put into a 96 well extraction plate. 200 µL of MGC binding buffer was added and tip mixed. The plate was incubated at room temperature for 5 minutes and then placed onto a 96 well ring magnet. Samples were washed twice with 70% ethanol. Beads were allowed to drive and DNA was eluted in 50 µL elution buffer. Results are depicted in FIG. 2 and Table 3, below.

TABLE 3

Triplex qPCR of samples with *Cannabis* matrix following DNase treatment and inactivation by detergent-mediated lysis and polynucleotide capture

| Sample | *Salmonella* DNA (2 ng/uL) | Dnase Treatment | Target | Ct (FAM) | Target | Ct (HEX) | Target | Ct (Texas Red) |
|---|---|---|---|---|---|---|---|---|
| TSB spiked with *e. coli* | 5 uL | None | *E. coli* | 24.81 | SCCG | 27.76 | *Salmonella* | 26.52 |
| TSB spiked with *e. coli* | 5 uL | None | *E. coli* | 24.84 | SCCG | 27.81 | *Salmonella* | 26.38 |
| TSB spiked with *e. coli* | 5 uL | None | *E. coli* | 24.74 | SCCG | 27.73 | *Salmonella* | 26.49 |
| TSB spiked with *e. coli* | 5 uL | Yes | *E. coli* | 24.84 | SCCG | 30.08 | *Salmonella* | ND |
| TSB spiked with *e. coli* | 5 uL | Yes | *E. coli* | 24.91 | SCCG | 29.94 | *Salmonella* | ND |
| TSB spiked with *e. coli* | 5 uL | Yes | *E. coli* | 25.02 | SCCG | 30.20 | *Salmonella* | ND |
| TSB spiked with *e. coli* | 10 uL | Yes | *E. coli* | 24.79 | SCCG | 30.33 | *Salmonella* | ND |
| TSB spiked with *e. coli* | 10 uL | Yes | *E. coli* | 24.82 | SCCG | 30.39 | *Salmonella* | ND |
| TSB spiked with *e. coli* | 10 uL | Yes | *E. coli* | 25.02 | SCCG | 30.42 | *Salmonella* | ND |

TABLE 3-continued

Triplex qPCR of samples with *Cannabis* matrix following DNase treatment and inactivation by detergent-mediated lysis and polynucleotide capture

| Sample | *Salmonella* DNA (2 ng/uL) | Dnase Treatment | Target | Ct (FAM) | Target | Ct (HEX) | Target | Ct (Texas Red) |
|---|---|---|---|---|---|---|---|---|
| TSB spiked with *e. coli* | 15 uL | Yes | *E. coli* | 24.96 | SCCG | 30.43 | *Salmonella* | ND |
| TSB spiked with *e. coli* | 15 uL | Yes | *E. coli* | 25.15 | SCCG | 30.53 | *Salmonella* | ND |
| TSB spiked with *e. coli* | 15 uL | Yes | *E. coli* | 25.00 | SCCG | 30.20 | *Salmonella* | ND |
| Pos Control | N/A | N/A | *E. coli* | 12.91 | SCCG | N/A | *Salmonella* | 13.82 |
| NTC | N/A | N/A | *E. coli* | 38.24 | SCCG | N/A | *Salmonella* | ND |

In this exemplary triplex qPCR analysis, an internal *Cannabis* marker (Hex) demonstrated that hemp DNA was partially digested. These results confirmed that the hemp sample includes both live DNA (i.e., from intact hemp cells) and dead DNA (i.e., DNA released or accessible from permeable dead hemp cells) as the Single Copy *Cannabis* Gene (SCCG) Cq was impacted by DNaseI digestion. This result was expected, as the hemp sample was dried and some cell lysis was expected in the drying process.

*Salmonella* DNA without DNase treatment is shown as a control. Notably, the high amounts of *Salmonella* gDNA spiked into the sample were completely removed with a simple 10 minute DNaseI digestion (Texas Red channel).

Further as expected, DNaseI did not digest DNA inside of intact (live) *E. coli* cells. Live *E. coli* cells were consistently measured between all samples in the FAM channel, demonstrating that *E. coli* DNA was protected by a cell membrane and was not digested by DNaseI.

Accordingly, the present example confirms that DNase enzyme robustly digests extracellular DNA in samples of *Cannabis* matrix, and further that detergent-mediated lysis and polynucleotide capture can effectively inactivate a DNase enzyme from these samples.

Example 3: Assay for Determining a Level of Live Microbial DNA in a Mock Partially Sterilized Sample This example describes quantification of live microbial DNA in mock sterilization samples that include both live microbial DNA and mock dead DNA (e.g., of free DNA or DNA of dead cells). To emulate a *Cannabis* sterilization process, samples were prepared that include live *E. coli* cells and free *E. coli* gDNA (mock "dead" *E. coli*), and additionally *Cannabis* matrix samples were prepared with identical proportions of live *E. coli* cells and free *E. coli* gDNA. Quantification efficacy was assess for DNase treatment and inactivation by detergent-mediated lysis and polynucleotide capture in mock sterilization samples.

To prepare mock sterilization samples, mixtures of overnight *E. coli* cultures were mixed with *E. coli* gDNA both in the presence and absence of *Cannabis* matrix (hemp) and exposed to DNaseI treatment (500 μL samples, 50 μL DNase Buffer and 10 μL DNase, 10 minutes at 37° C.). Results are depicted in Table 4 below and FIG. 3 and FIG. 4.

TABLE 4 qPCR analysis of mock sterilization samples following DNase treatment and inactivation by detergent-mediated lysis and polynucleotide capture

| Sample | Dnase Treatment | Target | Ct (FAM) | Target | Ct (HEX) |
|---|---|---|---|---|---|
| TSB spiked with *e. coli* DNA 5 uL at 2 ng/uL | None | *e. coli* | 22.59 | SCCG | ND |
| TSB spiked with *e. coli* DNA 5 uL at 2 ng/uL | None | *e. coli* | 22.48 | SCCG | ND |
| TSB spiked with *e. coli* DNA 5 uL at 2 ng/uL | Yes | *e. coli* | 34.54 | SCCG | ND |
| TSB spiked with *e. coli* DNA 5 uL at 2 ng/uL | Yes | *e. coli* | 34.54 | SCCG | ND |
| TSB + overnight *e. coli* culture | None | *e. coli* | 22.78 | SCCG | ND |
| TSB + overnight *e. coli* culture | None | *e. coli* | 22.54 | SCCG | ND |
| TSB + overnight *e. coli* culture | Yes | *e. coli* | 23.81 | SCCG | ND |
| TSB + overnight *e. coli* culture | Yes | *e. coli* | 23.81 | SCCG | ND |
| TSB + overnight *e. coli* culture + *e. coli* DNA 5 uL at 2 ng/uL | None | *e. coli* | 21.54 | SCCG | ND |
| TSB + overnight *e. coli* culture + *e. coli* DNA 5 uL at 2 ng/uL | None | *e. coli* | 21.43 | SCCG | ND |
| TSB + overnight *e. coli* culture + *e. coli* DNA 5 uL at 2 ng/uL | Yes | *e. coli* | 24.56 | SCCG | ND |
| TSB + overnight *e. coli* culture + *e. coli* DNA 5 uL at 2 ng/uL | Yes | *e. coli* | 24.56 | SCCG | ND |
| TSB + overnight *e. coli* culture + Hemp | None | *e. coli* | 23.26 | SCCG | 24.89 |
| TSB + overnight *e. coli* culture + Hemp | None | *e. coli* | 23.54 | SCCG | 25.09 |
| TSB + overnight *e. coli* culture + Hemp | Yes | *e. coli* | 24.92 | SCCG | 27.66 |

TABLE 4-continued qPCR analysis of mock sterilization samples following DNase treatment
and inactivation by detergent-mediated lysis and polynucleotide capture

| Sample | Dnase Treatment | Target | Ct (FAM) | Target | Ct (HEX) |
|---|---|---|---|---|---|
| TSB + overnight *e. coli* culture + Hemp | Yes | *e. coli* | 24.92 | SCCG | 27.66 |
| TSB + overnight *e. coli* culture + Hemp + *e. coli* DNA 5 uL at 2 ng/uL | None | *e. coli* | 21.52 | SCCG | 25.20 |
| TSB + overnight *e. coli* culture + Hemp + *e. coli* DNA 5 uL at 2 ng/uL | None | *e. coli* | 21.57 | SCCG | 25.31 |
| TSB + overnight *e. coli* culture + Hemp + *e. coli* DNA 5 uL at 2 ng/uL | Yes | *e. coli* | 24.60 | SCCG | 27.46 |
| TSB + overnight *e. coli* culture + Hemp + *e. coli* DNA 5 uL at 2 ng/uL | Yes | *e. coli* | 24.60 | SCCG | 27.75 |
| Pos Control | N/A | *e. coli* | 12.16 | SCCG | ND |
| NTC | N/A | *e. coli* | 37.74 | SCCG | N/A |

Figure 3:
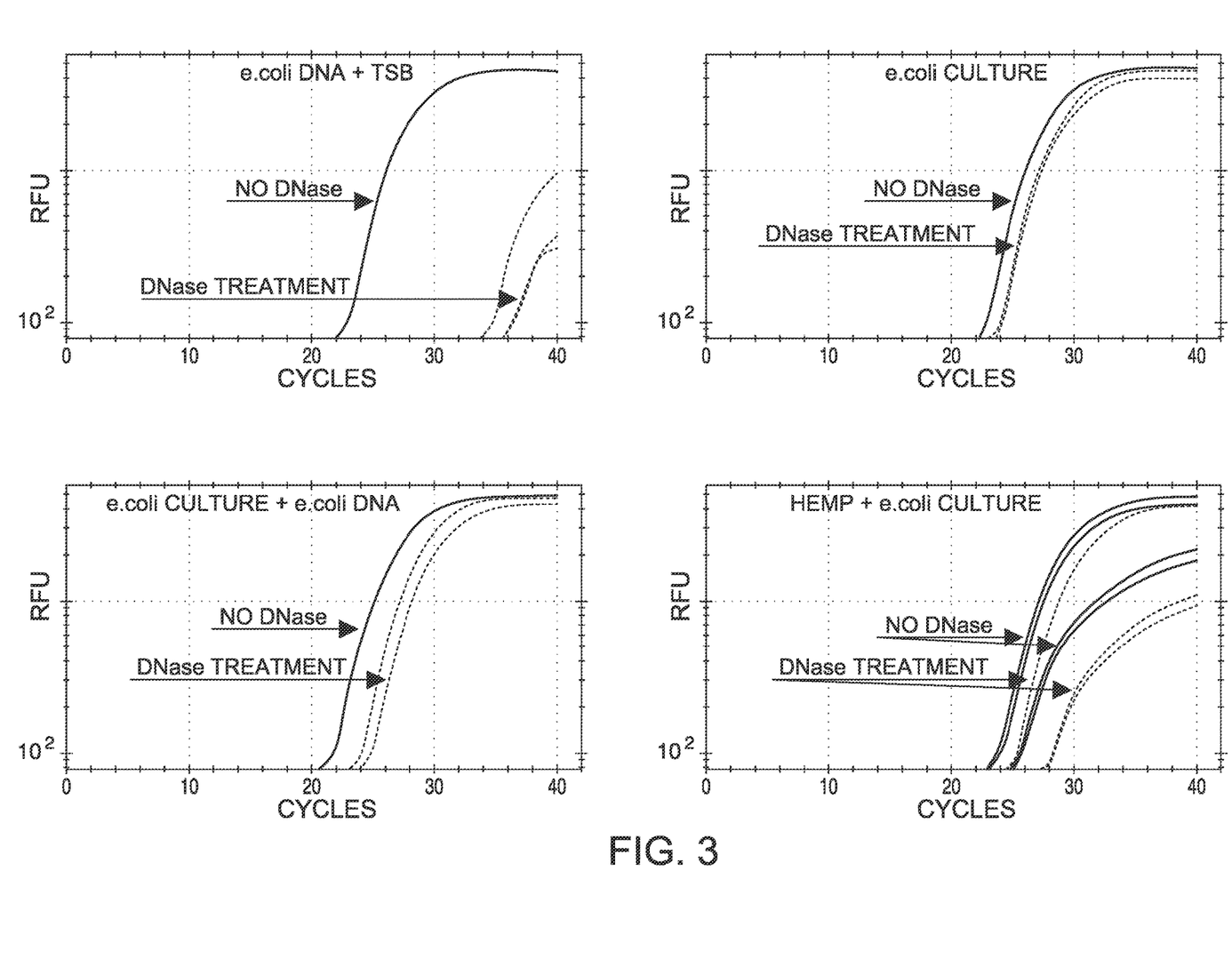
FIG. 3: depicts data from qPCR analyses of mock sterilization samples including both live *E. coli* cells (including genomic DNA (gDNA)) and free *E. coli* gDNA (mimicking gDNA from dead *E. coli* cells) with microbial DNA from samples, with and without *Cannabis* matrix (referred to in the graph as "hemp"). Values are presented in Table 4 below.

FIG. 3 includes data that demonstrates overnight *E. coli* growth with a ~1Cq (22 s 23) offset, suggesting that about half of the DNA in a saturated *E. coli* growth is DNaseI labile and presumably free DNA from lysed *E. coli* cells. 10 ng of *E. coli* gDNA was spiked into saturated *E. coli* culture to further stress test the DNaseI activity and model 90% sterilization (lower left panel). The same experiment was performed with the hemp background (lower right panel) (hemp in green), and accessible *Cannabis* DNA ("dead DNA") in dried *Cannabis* plant sample was detected.

Figure 4:
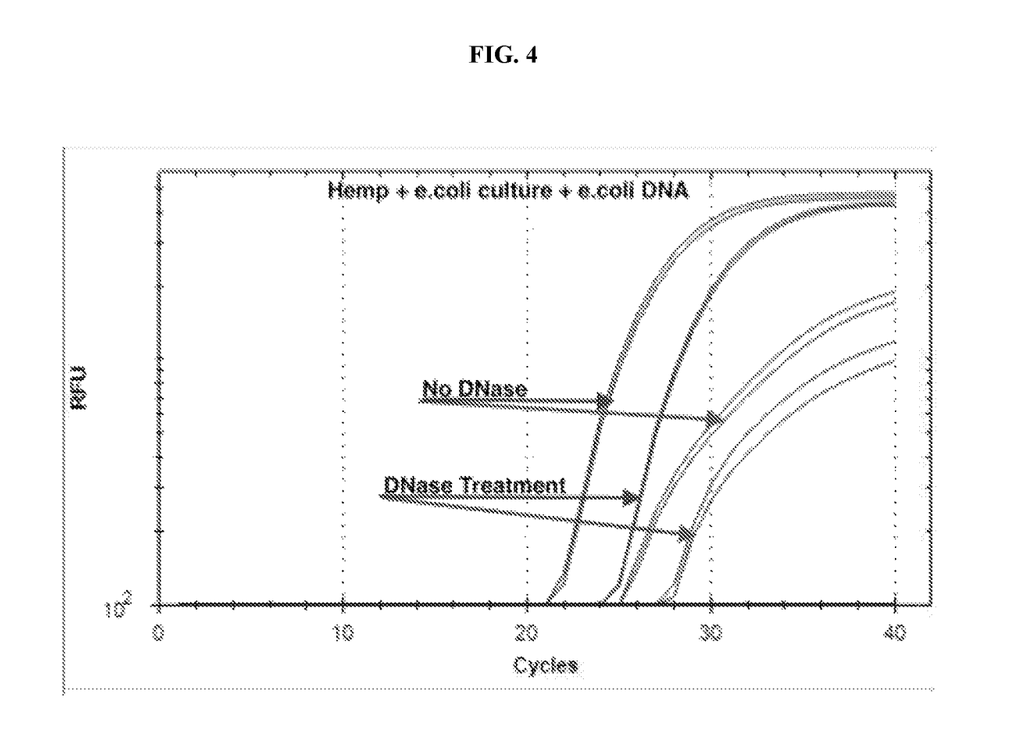
FIG. 4: depicts data from qPCR analyses of mock sterilization samples including both live *E. coli* cells (including genomic DNA (gDNA)) and free *E. coli* gDNA (mimicking gDNA from dead *E. coli* cells) in the presence of *Cannabis* matrix (referred to in the graph as "hemp").

FIG. 4 includes data that demonstrates that DNaseI inactivation of dead DNA in the presence of saturated culture spike with *E. coli* gDNA in the presence of a hemp background.

This example demonstrates that exemplary methods of the present disclosure can robustly and accurately quantify DNA levels both live microbes and freely accessible microbial DNA in a *Cannabis* matrix background.

Example 4: Characterization of Time Dependency of DNase Inactivation

This example describes temporal conditions DNase inactivation in exemplary methods of the present disclosure.

The effect of LiDS on DNase activity was observed to be concentration and time dependent. Irreversible DNase inactivation was required for downstream qPCR. When LiDs levels were dropped to levels of detergent seen in PCR buffers, DNase appeared still active over time. Goldenberger et al explored concentrations of SDS that inhibits PCR. (Goldenberger D, et al., A simple "universal" DNA extraction procedure using SDS and proteinase K is compatible with direct PCR amplification. PCR methods and applications (1995) 4(6):368-70). Ganaie et al. explore the concentrations of LiCl that inhibit PCR. (Ganaie M M. Inhibition of polymerase chain reaction by lithium chloride. International Journal of Life science and Pharma Research (2012) 2(4): L1-L5, ISSN 2250-0480).

Figure 5:
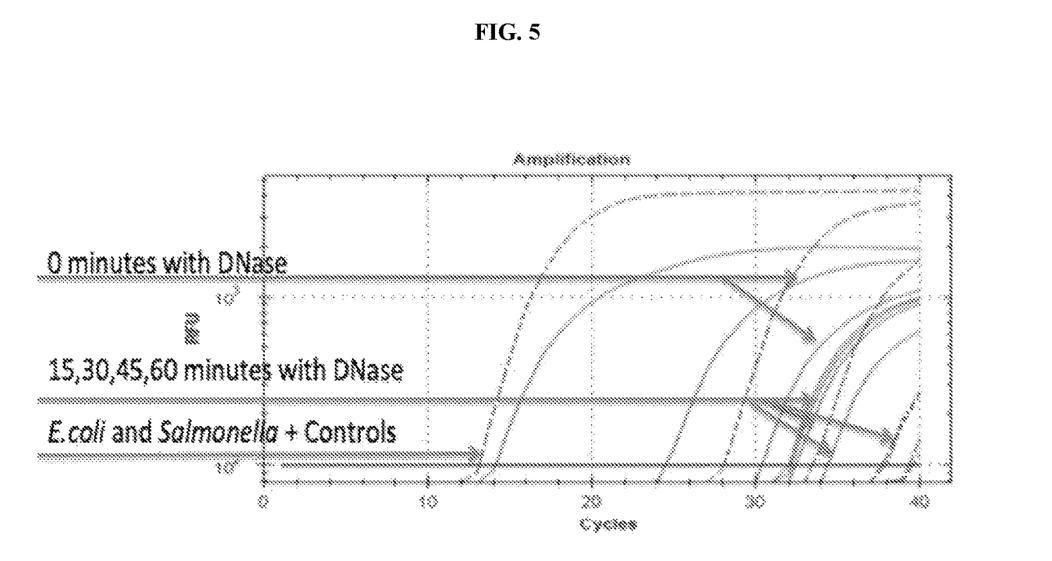

Samples were prepared by combining model genomic DNA (e.g., *E. coli* gDNA) with buffer and treatment with 20 μg/mL DNaseI. The amount of time for DNaseI digestion was varied with incubation at 37° C. (0 minutes, 15 minutes, 30 minutes, 45 minutes and 1 hour). Efficacy of DNAse inactivation by addition of low concentration of anionic detergent (total concentration of 0.043% LiDS) and polynucleotide capture agents is assessed. Result shown in FIG. 5 and Table 5 below.

TABLE 5 qPCR analysis of to assess effect of
increasing time for DNase treatment

| Sample | Target | Ct | Target | Ct |
|---|---|---|---|---|
| 10 μL *E. coli*, 20 μL DNase, 0.043% LiDS, 0 min incubation | *E. coli* | 33.55 | *Salmonella* | 24.54 |
| 10 μL *E. coli*, 20 μL DNase, 0.043% LiDS, 15 min incubation | *E. coli* | 28.05 | *Salmonella* | 30.41 |
| 10 μL *E. coli*, 20 μL DNase, 0.043% LiDS, 30 min incubation | *E. coli* | 37.95 | *Salmonella* | 32.13 |
| 10 μL *E. coli*, 20 μL DNase, 0.043% LiDS, 45 min incubation | *E. coli* | 37.76 | *Salmonella* | 32.42 |
| 10 μL *E. coli*, 20 μL DNase, 0.043% (w/v) LiDS, 60 min incubation | *E. coli* | 39.26 | *Salmonella* | 32.00 |
| Positive Control | *E. coli* | 13.07 | *Salmonella* | 14.08 |
| NTC | *E. coli* | ND | *Salmonella* | ND |

Both of the inhibitory conditions for PCR were below the levels required to inactivate DNase. As exemplified above, incubation of DNase with anionic detergent at a low concentration, within a range common to many PCR buffers (e.g., of 0.043% (w/v) LiDS), results in delayed Cq and thus more DNA digestion. These data obtained by qPCR analyses demonstrate that anionic detergent concentrations (e.g., LiDS) often found in PCR reactions are not sufficient to fully inactivate DNase.

The present example demonstrates that to fully inactivate DNase for quantitative live-dead, high concentrations of LiDS concurrent with crowding reagents and high salts force DNA to agglutinate on exemplary solid phase polynucleotide capture agents, away from the DNase enzyme.

EQUIVALENTS

It is to be understood that while the disclosure has been described in conjunction with the detailed description thereof, the foregoing description is intended to illustrate and not limit the scope of the invention(s). Other aspects, advantages, and modifications are within the scope of the following claims:

What is claimed is:
1. A method comprising:
(a) introducing a DNase I enzyme into a sample comprising (i) lysed cells of a *Cannabis* plant and (ii) live microbial cells comprising microbial genomic DNA;

(b) introducing lithium dodecyl sulphate (LiDS) as an anionic detergent into the sample, wherein the LiDS is in an amount effective to inactivate the DNase I enzyme in the sample and lyse the live microbial cells in the sample, thereby releasing the microbial genomic DNA from the microbial cells;

(c) introducing a known quantity of control DNA into the sample;

(d) contacting the sample with a plurality of polynucleotide capture agents that bind polynucleotides from the microbial genomic DNA and the control DNA in the sample;

(e) isolating the plurality of polynucleotide capture agents, thereby isolating polynucleotides from the microbial genomic DNA and the control DNA in the sample; and (f) amplifying at least a portion of the polynucleotides from the microbial genomic DNA and the control DNA isolated in step (e).

2. The method of claim 1, wherein each of steps 1 (b) to 1 (d) are performed (i) within 5 minutes of each other, (ii) within 2 minutes of each other, (iii) within 1 minute of each other, or (iv) simultaneously.

3. The method of claim 1, wherein the amplifying in step 1 (f) comprises quantitative PCR (qPCR).

4. The method of claim 3, wherein the qPCR is multiplexed qPCR.

5. The method of claim 3, wherein the data obtained by the qPCR is used to determine a level of microbial genomic DNA from live microbes in the sample of the *Cannabis* plant.

6. The method of claim 1, wherein the sample further comprises free microbial DNA from dead microbial cells.

7. The method of claim 6, wherein the amplifying in step 1 (f) comprises quantitative PCR (qPCR).

8. The method of claim 7, wherein data obtained by the qPCR is used to determine a live-dead ratio of microbial cells in the sample.

9. The method of claim 6, wherein the dead microbial cells are or include endophytic bacterial cells and/or endophytic fungal cells.

10. The method of claim 1, wherein the method further comprises introducing a known quantity of control DNA into the sample prior to step 1 (a), wherein the control DNA introduced prior to step 1 (a) is not the same as the control DNA introduced at step 1 (c).

11. The method of claim 10, wherein the control DNA introduced at step 1 (c) is a control for inactivation of the DNase I enzyme, and the control DNA introduced prior to step 1 (a) is a control for incomplete DNase I enzyme-mediated digestion.

12. The method of claim 1, wherein the plurality of polynucleotide capture agents are or comprise solid phase reversible immobilization (SPRI) agents.

13. The method of claim 12, wherein the SPRI agents are or comprise COOH beads.

14. The method of claim 1, wherein the effective amount of LiDS is within a range of 0.1% (w/v) to 5% (w/v).

15. The method of claim 14, wherein the effective amount of LiDS is within a range of 0.5% (w/v) to 5% (w/v).

16. The method of claim 1, wherein the live microbial cells are live endophytic cells.

17. The method of claim 1, wherein the live microbial cells are endophytic bacterial cells and/or endophytic fungal cells.

18. The method of claim 1, wherein the live microbial cells are or include *Aspergillus* cells.

19. The method of claim 18, wherein the *Aspergillus* cells are or include *Aspergillus ostianus, Aspergillus fumigatus, Aspergillus flavus, Aspergillus niger, Aspergillus terreus*, and/or *Aspergillus sydowii* cells.

20. The method of claim 1, wherein the *Cannabis* plant has been irradiated.

21. The method of claim 1, wherein the lysed cells are from a leaf, stem, and/or root of the *Cannabis* plant.

22. The method of claim 1, wherein the lysed cells are lysed by homogenization in a liquid broth.

23. The method of claim 1, wherein the *Cannabis* plant is a *C. sativa* plant.

24. The method of claim 1, wherein the method does not include introducing Proteinase K into the sample.

* * * * *